US010470076B2

United States Patent
Bergström et al.

(10) Patent No.: US 10,470,076 B2
(45) Date of Patent: Nov. 5, 2019

(54) WIRELESS DEVICE AND METHODS THEREIN FOR MAPPING DATA PACKETS TO RADIO BEARERS IN A WIRELESS COMMUNICATIONS NETWORK

(71) Applicant: Telefonaktiebolaget LM Ericsson (publ), Stockholm (SE)

(72) Inventors: Mattias Bergström, Stockholm (SE); Henning Wiemann, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/560,408

(22) PCT Filed: Aug. 22, 2017

(86) PCT No.: PCT/SE2017/050836
§ 371 (c)(1),
(2) Date: Sep. 21, 2017

(87) PCT Pub. No.: WO2018/038664
PCT Pub. Date: Mar. 1, 2018

(65) Prior Publication Data
US 2018/0270695 A1    Sep. 20, 2018

Related U.S. Application Data

(60) Provisional application No. 62/378,702, filed on Aug. 24, 2016.

(51) Int. Cl.
*H04W 28/02* (2009.01)
*H04W 72/12* (2009.01)
(Continued)

(52) U.S. Cl.
CPC ......... *H04W 28/0263* (2013.01); *H04L 47/20* (2013.01); *H04W 28/0268* (2013.01);
(Continued)

(58) Field of Classification Search
CPC .............. H04W 28/0263; H04W 28/0268
See application file for complete search history.

(56) References Cited

U.S. PATENT DOCUMENTS 8,260,886 B2 * 9/2012 Kling ............... H04L 63/101
    709/220
8,438,381 B2 * 5/2013 Haddad ............ H04L 63/0407
    370/392
(Continued)

FOREIGN PATENT DOCUMENTS

| EP | 2916613 A1 | 9/2015 |
|----|------------|--------|
| WO | 2010112077 A1 | 10/2010 |
| WO | 2016046007 A1 | 3/2016 |

OTHER PUBLICATIONS

Unknown, Author, "Precedence for reflective mapping", 3GPP TSG-RAN WG2 Meeting #97bis, R2-1703446, Spokane, USA, Apr. 3-7, 2017, 1-3.

(Continued)

*Primary Examiner* — Parth Patel
(74) *Attorney, Agent, or Firm* — Murphy, Bilak & Homiller, PLLC (57) ABSTRACT

A wireless device 108 and a method for mapping data packets to radio bearers in a wireless communication network 100. A Radio Network Node (RNN) 110 and the wireless device are operating in the wireless communications network. The wireless devices evaluates whether or not a data packet matches a packet filter in a first group of packet filters and/or a packet filter in a second group of packet filters. When the data packet does neither match a packet filter in the first group of packet filters nor a packet filter in the second group of packet filters, the wireless device maps the data packet to a default radio bearer.

19 Claims, 3 Drawing Sheets

Method performed by
the wireless communication device 108

(51) Int. Cl.
*H04L 12/813* (2013.01)
*H04L 12/851* (2013.01)
*H04W 28/10* (2009.01)

(52) U.S. Cl.
CPC ... *H04W 72/1263* (2013.01); *H04W 72/1268* (2013.01); *H04L 47/24* (2013.01); *H04W 28/10* (2013.01)

(56) References Cited

U.S. PATENT DOCUMENTS

| | | | | |
|---|---|---|---|---|
| 9,497,132 | B2* | 11/2016 | Saltsidis | H04L 47/34 |
| 9,917,769 | B2* | 3/2018 | Anand | H04L 45/54 |
| 10,154,525 | B2* | 12/2018 | Kuo | H04W 76/32 |
| 2009/0190591 | A1* | 7/2009 | Sankaran | H04L 45/00 |
| | | | | 370/392 |
| 2011/0090794 | A1* | 4/2011 | Cherian | H04L 45/38 |
| | | | | 370/235 |
| 2013/0121206 | A1* | 5/2013 | Turanyi | H04L 47/782 |
| | | | | 370/254 |
| 2013/0188491 | A1* | 7/2013 | Ludwig | H04L 47/2441 |
| | | | | 370/235 |
| 2014/0233380 | A1* | 8/2014 | Kim | H04W 28/24 |
| | | | | 370/230 |
| 2015/0016268 | A1* | 1/2015 | Merlin | H04W 28/0268 |
| | | | | 370/236 |
| 2015/0063101 | A1* | 3/2015 | Touati | H04W 76/12 |
| | | | | 370/230 |
| 2015/0215220 | A1* | 7/2015 | Yiu | H04L 47/2475 |
| | | | | 370/230 |
| 2016/0135222 | A1* | 5/2016 | Jain | H04W 74/04 |
| | | | | 370/329 |
| 2016/0165481 | A1* | 6/2016 | Jin | H04W 28/0263 |
| | | | | 370/236 |
| 2016/0294682 | A1* | 10/2016 | Bi | H04W 76/10 |
| 2017/0289836 | A1* | 10/2017 | Lovsen | H04W 28/0263 |
| 2017/0317894 | A1* | 11/2017 | Dao | H04L 41/5012 |
| 2017/0359749 | A1* | 12/2017 | Dao | H04W 28/0268 |
| 2018/0041936 | A1* | 2/2018 | Kim | H04W 4/70 |
| 2018/0139651 | A1* | 5/2018 | Kim | H04L 5/00 |
| 2018/0302935 | A1* | 10/2018 | Kawasaki | H04W 4/00 |

OTHER PUBLICATIONS

Unknown, Author, "Summary of email discussion on QoS framework", SA WG2 Meeting #116, S2-163427, Vienna, AT, Jul. 11-15, 2016, 1-16.

* cited by examiner

Fig. 1

Fig. 2 Method performed by
the wireless communication device 108

Fig. 3

WIRELESS DEVICE AND METHODS THEREIN FOR MAPPING DATA PACKETS TO RADIO BEARERS IN A WIRELESS COMMUNICATIONS NETWORK

TECHNICAL FIELD

Embodiments herein relate to a wireless device and methods therein. Especially, embodiments herein relate to mapping of data packets to radio bearers in a wireless communications network.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", "gNB", "gNodeB", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

The E-UTRA is the air interface of 3GPP's Long Term Evolution (LTE) upgrade path for mobile networks. It is an acronym for evolved UMTS Terrestrial Radio Access, also referred to as the 3GPP work item on the Long Term Evolution (LTE) also known as the Evolved Universal Terrestrial Radio Access (E-UTRA) in early drafts of the 3GPP LTE specification. E-UTRAN is the initialism of Evolved UMTS Terrestrial Radio Access Network and is the combination of E-UTRA, UEs and eNodeBs.

Quality of Service (QoS)

In E-UTRA, Quality of Service is achieved by mapping packets that require different treatment onto different radio bearers. Subsequently, the communications network and the wireless device, e.g. the UE, serve these radio bearers so that the packets mapped to said bearers observe the quality of service, e.g. delay, loss rate, etc., configured for that service and bearer.

In LTE the mapping of packets to radio bearers is achieved by packet filters. These packet filters allow filtering of packets by at least one of a source address, a destination address, a source port number, a destination port number and a protocol type. For example, a filter may match to packets indicating a certain source address in their IP header, i.e., all packets originating from a certain server. Or a filter may be configured to match all packets going to a particular port number.

In E-UTRA, packet filters are configured in the packet gateway for filtering downlink packets. Furthermore, packet filters are configured in the UE for filtering uplink packets. The filters in the UE are configured by the core network via the Non-Access-Stratum (NAS) protocol layer. The packet filters are associated with Evolved Packet System (EPS) Bearers so that a packet matching a filter is mapped to and transmitted on said associated EPS bearer. For a UE with an established RRC connection, each EPS bearer is mapped to an S1 bearer and to a radio bearer. The S1 bearer determines a path from the Core Network (CN) to the RAN, e.g. by means of the eNB, and the radio bearer determines a logical channel between the eNB and the UE.

For a New Radio (NR) interface, the core network is not expected to map packets to EPS bearers but rather to mark them with a Flow ID and/or a Flow Priority ID (FPI). The RAN, e.g. by means of the eNB, i.e. the gNB, and the UE may use said Flow ID and/or FPI to determine the radio bearer to which the packets should be mapped on the radio interface. Hence, in NR the radio bearer establishment as well as the mapping of higher layer packets to said radio bearers is left to the RAN, e.g. by means of the eNB.

It is envisioned that, similarly to E-UTRA, the eNB may provide the UE with a set of packet filters and thereby control which uplink packets the UE shall map to which radio bearer. For the downlink direction, e.g. from the eNB to the UE, the mapping of packets to radio bearers is up to eNB implementation and does not need to be configured and/or indicated to the UE a priori.

Besides such explicit configuration of uplink packet filters it is also being discussed that the UE may derive the uplink packet filters based on the downlink packets received on a plurality of radio bearers. This is referred to as "reflective QoS" and is described in the following section.

Reflective QoS

For the NR interface, the radio network, e.g. by means of the evolved Node B, eNB, may establish Data Radio Bearers (DRBs) and map selected downlink packets onto these DRBs. Instead of configuring the UE with uplink packet filters, the NR interface may also provide the possibility to command the UE to create so-called "reflective filters". The UE inspects received downlink packets and creates filters based on certain criteria and use these filters subsequently to filter corresponding uplink packets. For example, the UE may detect the flow IDs of all downlink packets received on a particular radio bearer and create a corresponding filter that identifies all uplink packets with the same flow ID and maps those onto the same radio bearer on which it previously received said downlink packets.

The packet filters configured explicitly by the communications network, e.g. by the CN or the RAN, enable a very accurate and deterministic filtering of packets, e.g. data packets, onto bearers, e.g. radio bearers. However, depending on the traffic characteristics, this scheme may require frequent reconfiguration of the filters which would cause a lot of control signalling on the radio interface and processing load in the RAN and/or the CN.

On the other hand, the "reflective QoS" mechanism aims to reduce the signalling load but can only be applied to uplink packets if corresponding downlink packets have been received previously. For some traffic the "reflective filter" created based on the observed downlink data may also not result in the desired uplink packet filtering. Hence, "reflective filters" alone cannot address all use cases and requirements.

SUMMARY

An object of embodiments herein is to overcome the above-mentioned drawbacks among others and to improve the performance in a wireless communications network.

According to an aspect of embodiments herein, the object is achieved by a method performed by a wireless communication device for mapping data packets to radio bearers in a wireless communication network. A radio network node and the wireless communications device are operating in the wireless communications network. The wireless communications device is sometimes in this disclosure referred to as just a wireless device.

The wireless communication device evaluates whether or not a data packet matches a packet filter in a first group of packet filters and/or a packet filter in a second group of packet filters.

When the data packet does neither match a packet filter in the first group of packet filters nor a packet filter in the second group of packet filters, the wireless communication device maps the data packet to a default radio bearer.

According to another aspect of embodiments herein, the object is achieved by a wireless communication device for mapping data packets to radio bearers in a wireless communication network. A radio network node and the wireless device are configured to operate in the wireless communications network.

The wireless communication device is configured to evaluate whether a data packet matches a packet filter in a first group of packet filters and/or a packet filter in a second group of packet filters.

The wireless communication device 108 may be configured to map the data packet to a radio bearer associated with a default mapping when the data packet does neither match a packet filter in the first group of packet filters nor in a packet filter in the second group of packet filters.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a carrier comprising the computer program, wherein the carrier is one of an electronic signal, an optical signal, a radio signal or a computer readable storage medium.

Since the wireless device evaluates mapping of data packets to radio bearers associated with packet filters in different groups of packet filters, and since the wireless device maps a data packet to a default radio bearer when the data packet does neither match a packet filter in a the first group of packet filters nor a packet filter in the second group of packet filters, the multiple flow-to-bearer mapping is improved. This results in an improved performance in the wireless communications system.

An advantage with embodiments herein is that the combination of the two kinds of filters enables both, fine grained and accurate and/or deterministic mapping of packets onto radio bearers as well as a scheme requiring very little configuration effort for the filters. By applying the two groups of filters in the proposed order it is ensured that network configured QoS mapping (if configured by the communications network) overrides any reflective QoS filters derived by the wireless device (if any) and thereby gives full QoS control to the network operator.

BRIEF DESCRIPTION OF DRAWINGS

Examples of embodiments herein will be described in more detail with reference to attached drawings in which.

DETAILED DESCRIPTION

As part of developing embodiments herein, some problems with the state of the art communications networks will first be identified and discussed.

As previously mentioned, the packet filters configured explicitly by the communications network, e.g. either by the CN or the RAN, enable a very accurate and deterministic filtering of packets onto one or more radio bearers. The term "filtering" when used in this disclosure relates to the action of deciding to which radio bearer a packet is to be mapped. However, depending on the traffic characteristics, this scheme may require frequent reconfiguration of the filters which will cause a lot of control signalling on the radio interface and an increased processing load in the RAN and/or the CN.

On the other hand and as also previously mentioned, the "reflective QoS" mechanism aims to reduce the signalling load but can only be applied to uplink packets if corresponding downlink packets have been received previously. For some traffic the "reflective filter" created based on the observed downlink data may also not result in the desired uplink packet filtering. Hence, "reflective filters" alone cannot address all use cases and requirements.

According to developments of wireless communications networks, improved multiple flow-to-bearer mappings are needed for improving the performance of the wireless communications network. By the expression "flow-to-bearer mapping" when used in this disclosure is meant mapping of one of more data packets to one or more radio bearers. The one or more of data packets may be referred to a flow, such as a flow of data packets.

Therefore, an object of embodiments herein is to overcome the above-mentioned drawbacks among others and to improve the performance in a wireless communications system. For example, an object of embodiments herein is to provide improved multiple types of flow-to-bearer mappings.

In some embodiments herein a wireless device applies both network-configured packet filters and reflective packet filters, wherein the two types of filters are arranged in two groups and wherein the network-configured filters are applied first. If any of the network-configured filters matches, the packet is sent on the radio bearer associated with that filter. In some embodiments, if and only if none of the pre-configured filters matches, the wireless device applies the reflective filters. If also none of the reflective filters matches, the packet may be mapped to a default radio bearer. However, it should be understood that in some embodiments, the reflective packet filters are applied before the network-configured packet filters. Further, it should be understood that in some embodiments, only one type of filters is evaluated and if none of the one type of filters match, the packet is mapped to the default radio bearer.

By grouping packet filters into different groups of packet filters and by executing one group of packet filters before another group of filters a deterministic and network-controlled behaviour is achieved.

Terminology

The following terminology is used in embodiments described herein and is elaborated below:

Network node: In some embodiments a more general term "network node" is used and it may correspond to any type of radio network node or any network node, which communicates with a UE and/or with another network node. Examples of network nodes are NodeB, MeNB, SeNB, a network node belonging to a Master Cell Group (MCG) or a Secondary Cell Group (SCG), Base Station (BS), multi-Standard Radio (MSR) radio node such as MSR BS, eNodeB, network controller, radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), core network node (e.g. Mobile Switching Center (MSC), Mobility Management Entity (MME) etc), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

User equipment/wireless device: In some embodiments the non-limiting terms wireless device, Mobile Station (MS) and User Equipment (UE) are used and they refer to any type of wireless device communicating with a network node and/or with another UE in a cellular or mobile communication system. Examples of UE/wireless device are Device-to-Device (D2D) UE, machine type UE or UE capable of machine to machine (M2M) communication, Personal Digital Assistant (PDA), Tablet, mobile terminals, smart phone, Laptop Embedded Equipped (LEE), Laptop Mounted Equipment (LME), Universal Serial Bus (USB) dongles, Customer premises Equipment (CPE) etc. In this disclosure the terms wireless device and UE are used interchangeably.

Note that although terminology from Global System for Mobile Communications (GSM)/GSM EDGE Radio Access Network (GERAN) has been used in this disclosure to exemplify embodiments, this should not be seen as limiting the scope of embodiments herein to only the aforementioned system. Other wireless systems, including Wideband Code Division Multiple Access (WCDMA), High Speed Packet Access (HSPA), Worldwide Interoperability for Microwave Access (WiMax), WiFi, Wireless Local Area Network (WLAN), 3GPP LTE, New Radio (NR), and 5G, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 1:
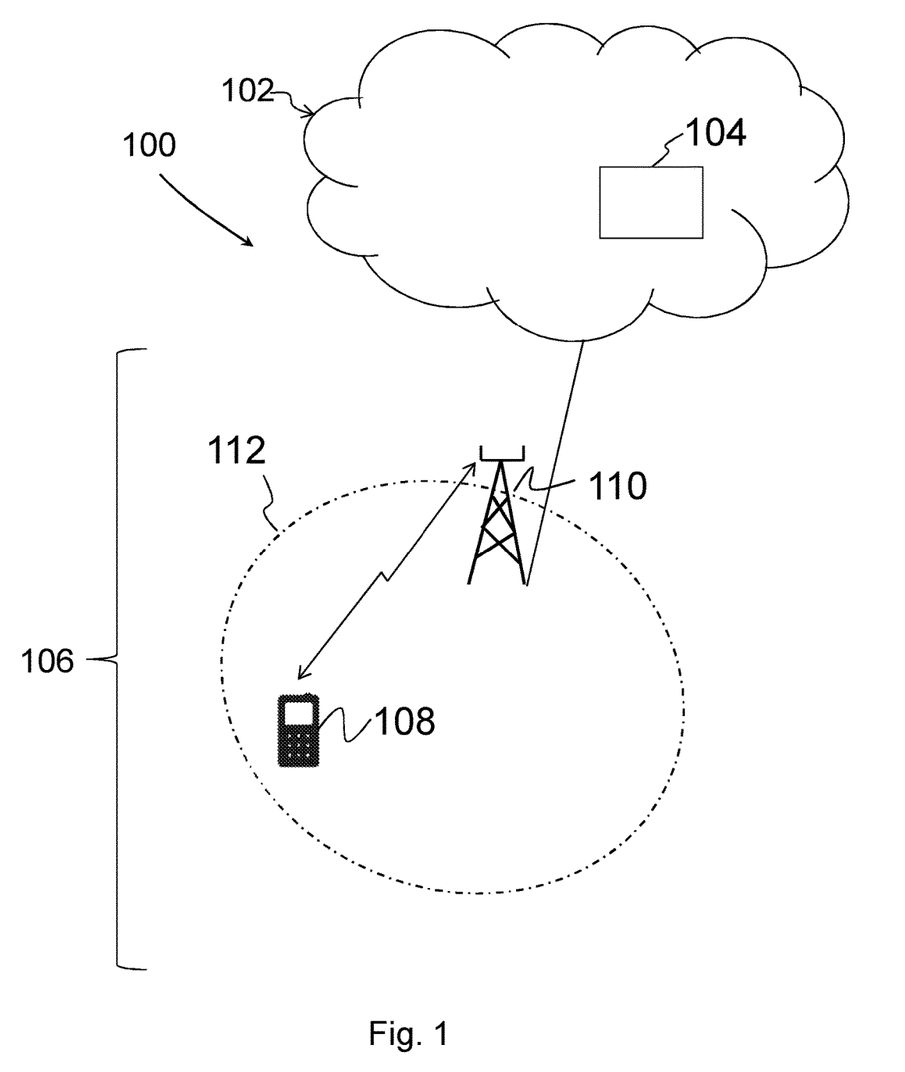
FIG. 1 schematically illustrates embodiments of a wireless communications system.

FIG. 1 depicts an example of the wireless communications network 100 in which embodiments herein may be implemented. The wireless communications network 100 is a wireless communication network such as a NR network, a 5G network, a GERAN network, an LTE network, a WCDMA network, a GSM network, any 3GPP cellular network, WiMAX network, or any wireless or cellular network.

A Core Network 102 is comprised in the wireless communications network 100. The core network 102 is a wireless core network such as a NR core network, a 5G core network, a GERAN core network, an LTE core network, e.g. a Evolved Packet Core (EPC); a WCDMA core network; a GSM core network; any 3GPP core network; WiMAX core network; or any wireless or cellular core network.

A core network node 104 operates in the core network 102. The core network node 104 may be a Mobile Switching Center (MSC), a Mobility Management Entity (MME), an Operation & Maintenance (O&M) node, a Serving GateWay (S-GW), a Serving General Packet Radio Service (GPRS) Node (SGSN), etc.

A wireless access network 106 is comprised in the wireless communications network 100. The wireless communications network 106 is sometimes referred to as a RAN. Further, the wireless communications network 106 may be a wireless communications network such as a NR access network, a 5G access network, a GERAN network, an LTE communications network, e.g. an Evolved UMTS Terrestrial Radio Access Network (E-UTRAN); a WCDMA communications network; a GSM communications network; any 3GPP communications network; WiMAX communications network; or any wireless or cellular communications network.

It should be understood that in some embodiments the core network 102 and the wireless communications network 106 are combined into one single network or that the wireless communications network 106 may comprise the core network 102.

A wireless device 108 is operating in the wireless communications network 100. The wireless device 108 also referred to as a user equipment or UE is located in the wireless communications network 100. The wireless device 108 may e.g. be a user equipment, a mobile terminal or a wireless terminal, a mobile phone, a computer such as e.g.

a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. The wireless device 108 is sometimes in this disclosure referred to as a wireless communications device.

A Radio Network Node (RNN) 110 serving a first geographical area, e.g. a first cell 112 such as a first serving cell. It should be understood that more than one RNN may be operating in the wireless communications network 100 and that one RNN may be configured to serve several geographical areas, e.g. cells.

The RNN 110 may be a radio access node such as a radio base station, for example an eNB, an eNodeB, or a Home Node B, an Home eNode B or any other network node capable to serve a user equipment or a machine type communication device in a wireless communications network.

The RNN 110 may be configured for wireless communication with one or more wireless devices, such as the wireless device 108, when the wireless device is located within the geographical area, e.g. the cells 112 served by the RNN 110. Herein, this is also specified as the RNN 110 manages or is configured to manage communication with one or more wireless devices in the respective geographical area. In this disclosure, the respective geographical area is sometimes referred to as a respective coverage area, cluster or cell. Further, when the wireless device is located within the geographical area and served by the RNN serving the geographical area, that geographical area may be referred to as a serving geographical area, e.g. a serving cell.

Figure 2:
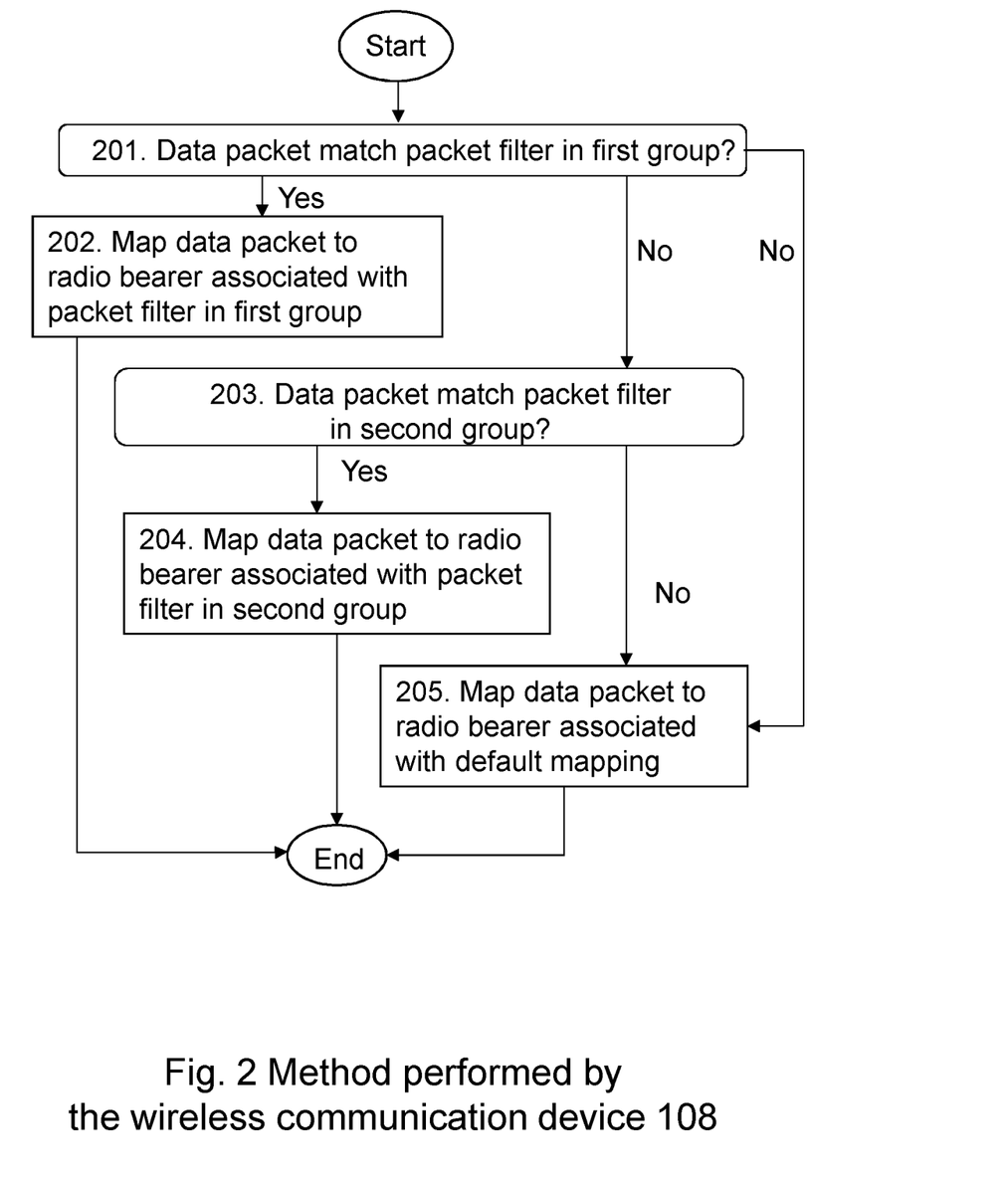
FIG. 2 is a flowchart depicting embodiments of a method performed by a wireless device.

An example of a method performed by the wireless device 108 for mapping data packet to radio bearers in the wireless communications network 100 will now be described with reference to a flowchart depicted in FIG. 2. As mentioned above, the wireless device 108 and the RNN 110 are operating in the wireless communications network 100.

The methods comprise one or more of the following actions. It should be understood that these actions may be taken in any suitable order and that some actions may be combined. Actions described below are performed to provide a deterministic and controlled mapping of a data packet to a radio bearer. In other words, actions described below are performed to provide a deterministic and controlled filtering of the data packet onto the radio bearer. Thus, the wireless device 108 may apply a number of filters in order to determine to which radio bearer to map a data packet.

Action 201

In order to improve mapping of a data packet to a radio bearer, the wireless device 108 evaluates whether or not a data packet matches a packet filter in a first group of packet filters.

The data packet may be a packet of a higher layer data flow that is to be mapped onto a radio bearer. Further, the data packet may be a data packet to be transmitted from the wireless device 108 to the RNN 110. Such a data packet may sometimes in this disclosure be referred to as an uplink data packet since it is to be transmitted in the uplink from the wireless device 108 to the RNN 110. The data packet may comprise one or more out of: a source Internet Protocol (IP) address, a destination IP address, a source port number, a destination port number, a protocol type, a flow identity, and/or a flow priority indicator.

Further, the first group of packet filters comprises one or more network-configured packet filters or one or more reflective packet filters.

The network-configured packet filters may be packet filters configured by the RNN 110, and thus the first group of packet filters may comprise one or more packet filters configured by the RNN 110. In some embodiments, the wireless device 108 receives the packet filters for the first group of packet filters from the RNN 110. The packet filter may comprise at least one out of: a source IP address, a destination IP address, a source port number, a destination port number, a protocol type, a flow identity, and a flow priority indicator.

In some embodiments, the wireless device 108 evaluates whether or not the data packet matches a packet filter in the first group of packet filters by comparing one or more fields of the data packet with corresponding one of more fields of the packet filter in the first group of packet filters, wherein the one or more fields comprises one or more out of: the source IP address, the destination IP address, the source port number, the destination port number, the protocol type, the flow identity, and the flow priority indicator.

Thus, if all of said one or more of the fields of the data packet matches the corresponding one or more of the fields of a packet filter in the first group of packet filters, the data packet is said to match the packet filter of the first group. A field of a packet is said to match the corresponding field of the packet filter, if the values are equal or if the filter does not comprise the corresponding field or if the filter indicates a wildcard for that field.

As mentioned above and in some embodiments, the packet filters in the first group are configured by the network node 110, such as the RNN 110, e.g. an eNB, of a wireless access network 106, such as a Radio Access Network (RAN). However, the packet filters in the first group may alternatively or additionally be configured by a network node of a core network 102, e.g. by a core network node 104.

In some embodiments, the packet filters in the first group are signalled to the wireless communication device 108 by the network node 110.

Action 202

When the data packet matches a packet filter in the first group of packet filters, the wireless device 108 maps the data packet to a radio bearer associated with the packet filter in the first group of packet filters.

In some embodiments, when the data packet matches the packet filter in the first group, the wireless device 108 refrains from evaluating whether or not the data packet matches a packet filter in a second group of packet filters. Evaluation of whether or not the data packet matches a packet filter in the second group of packet filters will be described in Action 203 below.

By the expression "the wireless device 108 maps the data packet to a radio bearer" when used in this disclosure is meant that the wireless device 108 associates the data packet to the radio bearer, which radio bearer the wireless device 108 will use when transmitting the data packet.

Action 203

When the data packet does not match a packet filter in the first group of packet filters, the wireless device 108 evaluates whether or not the data packet matches a packet filter in a second group of packet filters. Thus, the evaluation of whether or not the data packet matches a packet filter in the first group of packet filters may be performed before the evaluation of whether or not the data packet matches a packet filter in the second group of packet filters.

The second group of packet filters comprises one or more packet filters being different from the one or more packet filters comprised in the first group of packet filters. Thus, if the first group of packet filters comprises zero or more, e.g. one or more, network-configured packet filters, the second group of packet filters comprises zero or more, e.g. one or more, reflective packet filters. Vice versa, if the first group of packet filters comprises zero or more, e.g. one or more, reflective packet filters, the second group of packet filters comprises zero or more, e.g. one or more, network-configured packet filters. It should be understood that the packets filters in the first group of packet filters and the packet filters in the second group of packet filters may be of the same type but may be configured or set differently.

In some embodiments, the wireless device 108 evaluates whether or not the data packet matches a packet filter in the second group of packet filters by comparing one or more fields of the data packet with corresponding one of more fields of a packet filter in the second group of packet filters, wherein the one or more fields comprises one or more of: the source IP address, the destination IP address, the source port number, the destination port number, the protocol type, the flow identity, and the flow priority indicator. Thus, if all of said one or more of the fields of the data packet matches the corresponding one or more of the fields of a packet filter in the second group of packet filters, the data packet is said to match the packet filter of the second group. A field of a packet is said to match the corresponding field of the packet filter, if the values are equal or if the filter does not comprise the corresponding field or if the filter indicates a wildcard for that field.

Sometimes in this disclosure the radio bearer associated with the default mapping is referred to as a default radio bearer. The default radio bearer may be associated with a Public Data network (PDN) connection for the data packet.

In some embodiments, the wireless device 108 determines, e.g. creates, a packet filter of the second group of packet filters by evaluating one or more data packets received in one or more data radio bearers from the RNN 110. In other words, in some embodiments the wireless device 108 determines the packet filter of the second group of packet filters by evaluating one or more data packets transmitted in the downlink from the RNN 110 to the wireless device 108. Such one or more data packets may sometimes in this disclosure be referred to as one or more downlink data packets since they are transmitted in the downlink to the wireless device 108.

The wireless device 18 may determine, e.g. may create, the packet filter based on one or more out of: a source IP address, a destination IP address, a source port number, a destination port number, a protocol type, a flow identity, and a flow priority indicator comprised in the one or more data packets received from the RNN 110. Further, the wireless device 108 may store the determined packet filter in combination with an identifier of the data radio bearer in which the data packet has been received.

In some embodiments, at least one out of: the source IP address, the destination IP address, the source port number, the destination port number, the protocol type, the flow identity and/or the flow priority indicator is used by the wireless communication device 108, in combination with the identifier of the data radio bearer in which said data packet has been received, to determine a packet filter.

The RNN 110 may configure which at least one out of: the source IP address, the destination IP address, the source port number, the destination port number, the protocol type, the flow identity and/or the flow priority indicator the wireless device 108 shall use for the determining of the filter. In other words, the wireless device 108 may be configured by the RNN 110 to use one or more out of: the source IP address, the destination IP address, the source port number, the destination port number, the protocol type, the flow identity and/or the flow priority indicator to determine the packet filter.

In some embodiments, the packet filters comprise at least one out of: the source IP address, the destination IP address, the source port number, the destination port number, the protocol type, the flow identity and the flow priority indicator.

Action 204

When the data packet matches a packet filter in the second group of packet filters, the wireless device 108 maps the data packet to a radio bearer associated with the packet filter in the second group of packet filters.

Action 205

When the data packet does not match a packet filter in the second group of packet filters, the wireless device 108 maps the data packet to a radio bearer associated with a default mapping.

In some embodiments, the wireless device 108 further transmits, to the RNN 110, the data packet using the radio bearer to which the data packet has been mapped.

As mentioned above and in some embodiments, when the data packet matches the packet filter in the first group, the wireless device 108 refrains from evaluating whether or not the data packet matches a packet filter in the second group of packet filters. Thus, in such embodiments, the packet matching any of the packets in said first group of filters is sent on the radio bearer associated with that filter, and the filters of said second group of filters is not evaluated or applied.

Figure 3:
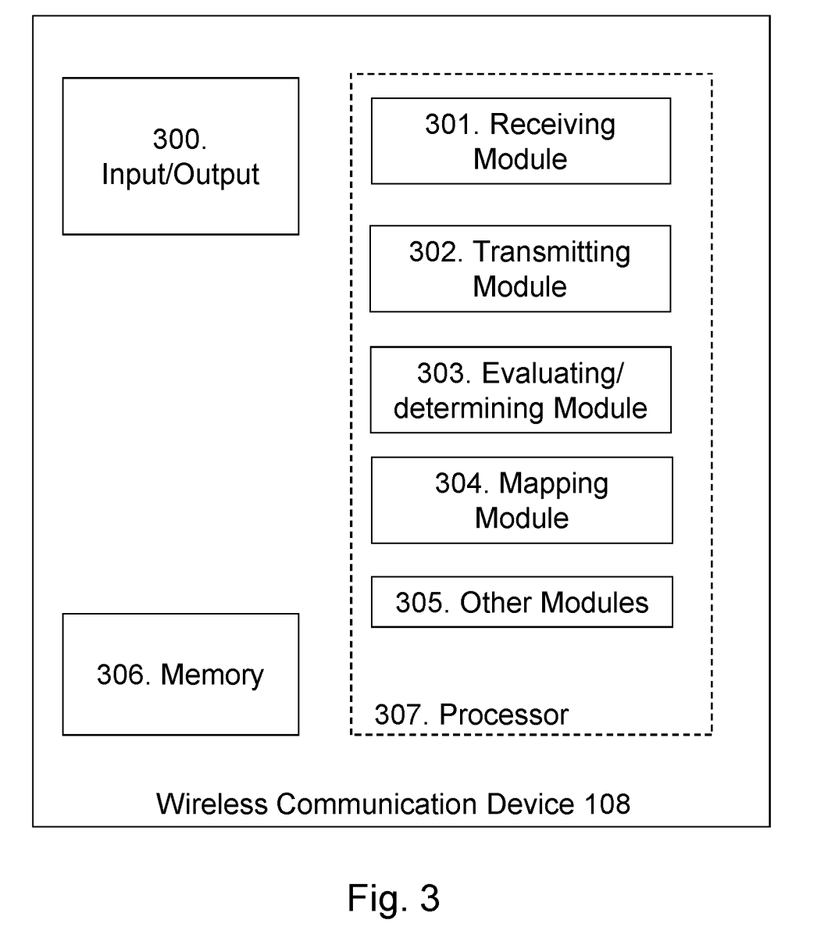
FIG. 3 is a schematic block diagram illustrating embodiments of a wireless device.

To perform the method for mapping data packet to radio bearers in the wireless communications network, the wireless device 108 may be configured according to an arrangement depicted in FIG. 3. As previously described, the wireless device 108 and the RNN 110 are configured to operate in the wireless communications network 100.

In some embodiments, the wireless device 108 comprises an input and/or output interface 300 configured to communicate with one or more wireless devices, one or more radio network nodes, e.g. the RNN 110, and one or more other network nodes, e.g. the core network node 104. The input and/or output interface 300 may comprise a wireless receiver (not shown) and a wireless transmitter (not shown).

The wireless device 108 is configured to receive, by means of a receiving module 301 configured to receive, a transmission, e.g. a data packet, a signal or information, from a RNN, e.g. from the RNN 110. The receiving module 301 may be implemented by or arranged in communication with a processor 307 of the wireless device 108. The processor 307 will be described in more detail below.

For example, the wireless device 108 may be configured to receive a downlink data packet from the RNN 110.

In some embodiments, the wireless device 108 is configured to receive packet filters from the RNN 110. For example, the wireless device 108 may be configured to receive network-configured packet filters from the RNN 110.

The wireless device 108 is configured to transmit, by means of a transmitting module 302 configured to transmit, a transmission, e.g. a data packet, a signal or information, to the RNN, e.g. the RNN 110. The transmitting module 302 may be implemented by or arranged in communication with the processor 307 of the wireless device 108.

For example, the wireless device 108 may be configured to transmit an uplink data packet to the RNN 110. The uplink data packet may be mapped to a radio bearer associated with a packet filter of the first or second group of packet filters or to a radio bearer associated with a default mapping. Thus, the wireless device 108 may be configured to transmit the uplink packet to the RNN 110 using the mapped radio bearer.

The wireless device 108 is configured to determine and/or evaluate, by means of a determining and evaluating module 303 configured to determine and/or evaluate, whether or not a data packet matches a packet filter in a group of packet filters. The determining and evaluating module 303 may be implemented by or arranged in communication with the processor 307 of the wireless device 108.

In some embodiments, the wireless device 108 is configured to evaluate whether or not the data packet matches a packet filter in the first and/or the second group of packet filters.

The wireless device 108 may be configured to evaluate whether or not the data packet matches the packet filter in the first and/or the second group of packet filters by comparing one or more fields of the data packet with corresponding one of more fields of the packet filter in the first and/or second group of packet filters, wherein the one or more fields comprises one or more of: the source IP address, the destination IP address, the source port number, the destination port number, the protocol type, the flow identity, and the flow priority indicator.

It should be understood that the number of groups of packet filters is at least two and that some embodiments comprises more than two groups of packet filters. For example the default mapping may be considered as a mapping of the data packet to a default radio bearer associated with a packet filter in a third group of packet filters.

In some embodiments, the packet filters in the first group are configured by the network node 110.

In some embodiments, the wireless communication device 108 is configured to receive the packet filters in the first group from the network node.

In some embodiments, the wireless communication device 108 is configured to determine, e.g. create, the packet filters in the second group by being configured to evaluate data packets received from the network node 110. In some embodiments, the wireless communication device 108 is configured to evaluate data packets received from the network node 110 by being configured to detect at least one out of: a source IP address, a destination IP address, a source port number, a destination port number, a protocol type, a flow identity and a flow priority indicator in the received data packet in combination with an identifier of a data radio bearer in which said data packet has been received. Thus, based on the identifier of the data radio bearer in which the data packet has been received and based on the detected at least one of the source IP address, the destination IP address, the source port number, the destination port number, the protocol type, the flow identity and the flow priority indicator, the wireless communications device 108 is configured to evaluate data packets received from the network node 110.

In some embodiments, the wireless device 108 is configured to use at least one out of: the source IP address, the destination IP address, the source port number, the destination port number, the protocol type, the flow identity and the flow priority indicator to determine a packet filter.

In some embodiments, the packet filters comprise at least one out of: the source IP address, the destination IP address, the source port number, the destination port number, the protocol type, the flow identity and the flow priority indicator.

The wireless device 108 may further be configured to map, by a mapping module 304 configured to map, the data packet, i.e. the uplink packet, to a radio bearer associated with a packet filter in a group of filters or to a radio bearer associated with a default mapping. The mapping module 304 may be implemented by or arranged in communication with the processor 307 of the wireless device 108.

By the expression "the wireless device 108 is configured to map the data packet to a radio bearer" when used in this disclosure is meant that the wireless device 108 is configured to associate the data packet to the radio bearer, which radio bearer the wireless device 108 is configured to use when transmitting the data packet.

In some embodiments, the wireless device 108 is configured to perform, by means of one or more other modules 305 configured to perform one or more further actions described herein. The one or more other modules 305 may be implemented by or arranged in communication with the processor 307 of the wireless device 108.

The wireless device 108 may also comprise means for storing data. In some embodiments, the wireless device 108 comprises a memory 306 configured to store the data. The data may be processed or non-processed data and/or information relating thereto. The memory 306 may comprise one or more memory units. Further, the memory 306 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the wireless device 108.

Embodiments herein for handling of multiple flow-to-bearer mappings, e.g. for mapping one or more data packets to one or more radio bearers, may be implemented through one or more processors, such as the processor 307 in the arrangement depicted in FIG. 3, together with computer program code for performing the functions and/or method actions of embodiments herein. The program code mentioned above may also be provided as a computer program product, for instance in the form of a data carrier carrying computer program code for performing the embodiments herein when being loaded into the wireless device 108. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 108.

Those skilled in the art will also appreciate that the input/output interface 300, the receiving module 301, the transmitting module 302, the evaluating module 303, the mapping module 304, and the one or more other modules 305 above may refer to a combination of analogue and digital circuits, and/or one or more processors configured with software and/or firmware, e.g. stored in the memory 306, that when executed by the one or more processors such as the processors in the wireless device 108 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

Below some exemplifying embodiments will be described. It should be understood that one or more features or actions from one embodiments may be combined with one or more features or actions from one or more other embodiments.

Further in this disclosure, any reference to the UE is understood to equally refer to the wireless device 108, and any reference to the eNB is understood to refer to the RRN 110.

As previously mentioned, in some embodiments, there exist mechanisms according to which the eNB, e.g. the RNN 110, may provide a flow, e.g. a flow of data packets, to DRB-mapping which dictates which DRB a certain flow should be transmitted over. Another mechanism which dictates a mapping between flows and DRBs is that the UE, e.g. wireless device 108, applies "reflective QoS" where the wireless device 108 observes over which DRB the RNN 110 transmits packets to the wireless device 108 and the wireless device 108 derives filters ensuring that packets with corresponding uplink characteristics are mapped to same radio bearer.

Some embodiments described herein is characterized by applying in a wireless device 108 both network-configured packet filters and reflective packet filters, wherein the two types of filters are arranged in two groups and wherein the network-configured filters are applied first. However, as previously mentioned, the filters in the two groups may be applied in a different order, and sometimes evaluation of only one or more filters from one of the groups is performed.

Default Mapping

In addition to the network-configured packet filters and the reflective packet filters, the wireless device 108 may also be configured with a default radio bearer. The wireless device 108 may map all packets that match none of the network configured filters and none of the reflective filters to this default bearer. As previously mentioned, the default radio bearer is a radio bearer associated with a default mapping.

Hence, in the context of this disclosure, the mapping of packets not matching any of the above mentioned other filters may be denoted as a third group of filters according to which the wireless device 108 realizes a default mapping for a packet or flow for which no other mapping applies. Thus, some embodiments may comprise three groups of packet filters.

The default mapping may be to map this flow to a default bearer, e.g. to a default radio bearer. This allows the wireless device 108 to transmit traffic of a flow on a radio bearer, e.g. a Data Radio Bearer (DRB), even though the wireless device 108 has not received any explicit mapping or for which the wireless device 108 has not received any packets from the communications network, e.g. from the core network 102 or the access network 106. There may be several default bearers, e.g. there may be one default bearer associated with each per PDN-connection which may be referred to as "PDU-session". In this case the wireless device 108 may match, e.g. filter, packets of a flow to a default bearer depending on which PDN-connection the flow belongs to.

For example, if flow A belongs to PDN-connection X and PDN-connection X has a default bearer 1 while flow B belongs to PDN-connection Y and PDN-connection Y has a default bearer 2; then flow A may be mapped to bearer 1 by default while flow B may be mapped to bearer 2 as default.

Several Applicable Mapping Mechanisms

In case several mapping mechanisms dictate a certain mapping, the wireless device 108 may apply a prioritization-rule to select which of the mappings or which of the mechanism for mapping to apply.

For example, the following mapping mechanisms may all be applicable to and/or supported by and/or active for the wireless device 108: explicitly signalled mapping, reflective QoS and as described above default mapping. Then the wireless device 108 may apply a prioritization-rule between these mechanisms.

For example, the wireless device 108 may apply the following prioritization:
1. Explicitly signalled mapping—high priority
2. Reflective QoS mapping—medium priority
3. Default mapping—low priority This means that if a packet matches an explicitly signalled mapping from the RNN 110, the wireless device 108 ignores any mapping suggested by the reflective QoS mechanism and the default mapping.

On the other hand, if the wireless device 108 has not been configured with any explicitly signalled mapping or if a packet does not match any of the configured explicit mappings, the wireless device 108 applies the reflective QoS mappings if any have been determined by the wireless device 108.

If neither explicit mappings have been configured or match nor reflective QoS mappings have been configured or match, the wireless device 108 would apply the default mapping (as described above).

However, another prioritization of the mapping may apply. As another example, the reflective QoS mapping may be applied before the explicitly signalled mapping.

The explicitly signalled mapping is sometimes in this disclosure referred to as network-configured mapping using the network-configured packet filters.

The reflective QoS mapping uses the reflective packet filters.

Invalidated Reflective QoS

According to some embodiments, the wireless device 108 may invalidate a mapping depending on certain events, such as e.g. the mapping suggested and/or dictated by reflective QoS. Examples of some certain events comprise:
  (re)configuration of the DRB which the flow is mapped to. The filters determined based on the reflective QoS mapping mechanism remain valid until a reconfiguration of the associated DRB, e.g. of certain parameters of the associated DRB. For example, if a DRB was initially configured to support very tight demanding QoS and/or high demanding QoS requirements but then one or more parameters of the DRB are reconfigured, the wireless device 108 would consider the filters, e.g. the mappings, associated with the bearer to be invalid and discard the filters.
  the wireless device 108 has not received any packets in downlink of the flow from the communications network 100, e.g. from the RNN 110, for a time, e.g. a time period, T or if too many reflective filters have been determined by the wireless device 108. If any of the two events occurs, the wireless device 108 may discard these filters. This may in particular be necessary to keep the processing, e.g. the filtering, complexity sufficiently low, i.e., to ensure that an incoming uplink packet does not need to be matched against too many filters, e.g. against outdated filters.

In case the reflective QoS mapping becomes invalid, the wireless device 108 may start applying another mapping, e.g. the default mapping.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a wireless device, in communication with a Radio Network Node (RNN) in a wireless communication network, for mapping data packets to one or more radio bearers associated with the RNN, the method comprising:
deriving one or more uplink packet filters, that comprise a second group of uplink packet filters, based on characteristics of one or more downlink data packets received via one or more data radio bearers (DRBs), wherein the downlink data packet characteristics used to derive the second group do not include an uplink packet filter configuration from the wireless communication network;
determining if an uplink data packet matches at least one of a plurality of uplink packet filters, the plurality of uplink packet filters comprising: the second group, and a first group of uplink packet filters that are configured by the wireless communication network and are not derived based on the characteristics of the received downlink data packets;
if it is determined that the uplink data packet matches at least one of the plurality of uplink packet filters, mapping the uplink data packet to a radio bearer associated with a matching uplink packet filter;
if it is determined that the uplink data packet does not match any of the plurality of uplink packet filters, mapping the uplink data packet to a default radio bearer; and
transmitting the uplink data packet to the RNN via the radio bearer to which it was mapped.

2. The method of claim 1, comprising:
if it is determined that the uplink data packet matches at least one uplink packet filter in the first group of uplink packet filters, mapping the uplink data packet to a radio bearer associated with a matching uplink packet filter in the first group.

3. The method of claim 1, comprising:
if it is determined that the uplink data packet matches at least one uplink packet filter in the second group of packet filters, mapping the uplink data packet to a radio bearer associated with a matching uplink packet filter in the second group.

4. The method of claim 1, wherein determining if the uplink data packet matches at least one of the plurality of uplink packet filters comprises at least one of the following:
evaluating if the uplink data packet matches at least one uplink packet filter in the first group, and if the uplink data packet matches at least one uplink packet filter in the first group, refraining from evaluating if the uplink data packet matches at least one uplink packet filter in the second group; and
evaluating if the uplink data packet matches at least one uplink packet filter in the first group before evaluating if the uplink data packet matches at least one uplink packet filter in the second group.

5. The method of claim 1, comprising:
receiving, from the RNN, an explicit configuration of uplink packet filters comprising the first group.

6. The method of claim 1,
wherein the one or more uplink packet filters comprising the second group are derived based on one or more of the following characteristics of the one or more downlink data packets received via the one or more DRBs: a downlink source Internet Protocol (IP) address, a downlink destination IP address, a downlink source port number, a downlink destination port number, a protocol type, a flow identity, and a flow priority indicator; and
further comprising storing the determined uplink packet filter in combination with an identifier of the DRB in which the downlink data packet was received.

7. The method of claim 1, wherein each derived uplink packet filter comprises at least one of: an uplink source IP address, an uplink destination IP address, an uplink source port number, an uplink destination port number, a protocol type, a flow identity, and a flow priority indicator.

8. The method of claim 1, wherein determining if the uplink data packet matches at least one of the plurality of uplink packet filters comprises:
comparing one or more fields of the uplink data packet with corresponding one or more fields of one or more of the uplink packet filters, wherein the one or more fields comprises one or more of the following: an uplink source IP address, an uplink destination IP address, an uplink source port number, an uplink destination port number, a protocol type, a flow identity, and a flow priority indicator.

9. The method of claim 1, wherein the default radio bearer is associated with a Public Data Network (PDN) connection for the data packet.

10. A wireless device for mapping data packets to one or more radio bearers associated with a Radio Network Node (RNN) in a wireless communication network, the wireless device comprising:
at least one processor: and
at least one memory storing computer-executable instructions that, when executed by the at least one processor, configures the wireless device to:
derive one or more uplink packet filters, that comprise a second group of uplink packet filters, based on characteristics of one or more downlink data packets received via one or more data radio bearers (DRBs), wherein the downlink data packet characteristics used to derive the second group do not include an uplink packet filter configuration from the wireless communication network;
determine if an uplink data packet matches at least one of a plurality of uplink packet filters, the plurality of uplink packet filters comprising: the second group, and a first group of uplink packet filters that are configured by the wireless communication network and are not derived based on the characteristics of the received downlink data packets;
if it is determined that the uplink data packet matches at least one of the plurality of uplink packet filters, map the uplink data packet to a radio bearer associated with a matching uplink packet filter;

if it is determined that the uplink data packet does not match any of the plurality of uplink packet filters, map the uplink data packet to a default radio bearer; and transmit the uplink data packet to the RNN via the radio bearer to which it was mapped.

11. The wireless device of claim 10, wherein the instructions, when executed by the at least one processor, further configure the wireless device to:

if it is determined that the uplink data packet matches at least one uplink packet filter in the first group of uplink packet filters, map the uplink data packet to a radio bearer associated with a matching uplink packet filter in the first group.

12. The wireless device of claim 10, wherein the instructions, when executed by the at least one processor, further configure the wireless device to:

if it is determined that the uplink data packet matches at least one uplink packet filter in the second group of packet filters, map the uplink data packet to a radio bearer associated with a matching uplink packet filter in the second group.

13. The wireless device of claim 10, wherein the executed instructions configure the wireless device to determine if the uplink data packet matches at least one of the plurality of packet filters by performing at least one of the following:

evaluating if the uplink data packet matches at least one uplink packet filter in the first group, and if the uplink data packet matches at least one uplink packet filter in the first group, refraining from evaluating if the uplink data packet matches at least one uplink packet filter in the second group; and evaluating if the uplink data packet matches at least one uplink packet filter in the first group before evaluating if the uplink data packet matches at least one uplink packet filter in the second group.

14. The wireless device of claim 10, wherein the instructions, when executed by the at least one processor, further configure the wireless device to:

receive, from the RNN, an explicit configuration of uplink packet filters comprising the first group.

15. The wireless device of claim 10, wherein the instructions, when executed by the at least one processor, further configure the wireless device to:

derive the one or more uplink packet filters comprising the second group based on one or more of the following characteristics of the one or more downlink data packets received via the one or more DRBs: a downlink source Internet Protocol (IP) address, a downlink destination IP address, a downlink source port number, a downlink destination port number, a protocol type, a flow identity, and a flow priority indicator; and store the determined uplink packet filter in combination with an identifier of the DRB in which the downlink data packet was received.

16. The wireless device of claim 10, wherein each derived uplink packet filter comprises at least one of: an uplink source IP address, an uplink destination IP address, an uplink source port number, an uplink destination port number, a protocol type, a flow identity, and a flow priority indicator.

17. The wireless device of claim 10, wherein the executed instructions configure the wireless device to determine if the uplink data packet matches at least one of the plurality of uplink packet filters by:

comparing one or more fields of the uplink data packet with corresponding one or more fields of one or more of the uplink packet filters, wherein the one or more fields comprises one or more of the following: an uplink source IP address, an uplink destination IP address, an uplink source port number, an uplink destination port number, a protocol type, a flow identity, and a flow priority indicator.

18. The wireless device of claim 10, wherein the default radio bearer is associated with a Public Data Network (PDN) connection for the data packet.

19. A non-transitory, computer-readable medium comprising instructions that, when executed on at least one processor, configure a wireless device to:

derive one or more uplink packet filters, that comprise a second group of uplink packet filters, based on characteristics of one or more downlink data packets received via one or more data radio bearers (DRB), wherein the downlink data packet characteristics used to derive the second group do not include an uplink packet filter configuration from the wireless communication network;

determine if an uplink data packet matches at least one of a plurality of uplink packet filters, the plurality of uplink packet filters comprising: the second group, and a first group of uplink packet filters that are configured by the wireless communication network and are not derived based on the characteristics of the received downlink data packets;

if it is determined that the uplink data packet matches at least one of the plurality of uplink packet filters, map the uplink data packet to a radio bearer associated with a matching uplink packet filter;

if it is determined that the uplink data packet does not match any of the plurality of uplink packet filters, map the uplink data packet to a default radio bearer; and transmit the uplink data packet to the RNN via the radio bearer to which it was mapped.

* * * * *